United States Patent [19]

Lafon

[11] 3,723,527
[45] Mar. 27, 1973

[54] 1-NAPHTHYL-1-HYDROXY-ACETAMIDINE DERIVATIVES, THEIR PREPARATION AND USE

[75] Inventor: Louis Lafon, Paris, France

[73] Assignee: Societe anonyme dite: Orsymonde, Paris, France

[22] Filed: Apr. 22, 1970

[21] Appl. No.: 31,007

[30] Foreign Application Priority Data

Apr. 24, 1969 France....................6913031

[52] U.S. Cl.............260/564 R, 260/564 G, 424/326
[51] Int. Cl...........................................C07c 123/00
[58] Field of Search...................................260/564 R

[56] References Cited

UNITED STATES PATENTS 3,290,375   12/1966   Harfenist et al......................260/564

Primary Examiner—Leon Zitver
Assistant Examiner—Gerald A. Schwartz
Attorney—Saul Jecies

[57] ABSTRACT

1-Naphthyl-1-hydroxyacetamidines and their non-toxic salts are useful for treating arterial hypertension.

3 Claims, No Drawings

1-NAPHTHYL-1-HYDROXY-ACETAMIDINE DERIVATIVES, THEIR PREPARATION AND USE

This invention relates to amidine derivatives, their preparation and use.

The present invention provides, as new compounds, the 1-naphthyl-1-hydroxy acetamidine derivatives of the formula:

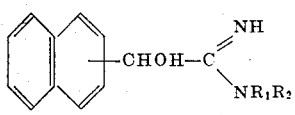

and their non-toxic acid addition salts, in which $R_1$ and $R_2$ are identical or different and each represents a hydrogen atom, or a lower alkyl, phenyl, or hydroxyl radical. More particularly, $R_1$ and $R_2$ may each represent a hydrogen atom or $R_1$ represents hydrogen and $R_2$ represents a lower alkyl radical such as isopropyl. These new compounds exert activities on the cardiovascular system and are particularly for the treatment of arterial hypertension.

The compounds of formula I and their non-toxic acid addition salts are prepared by reacting a lower aliphatic alcohol with a nitrile of the formula:

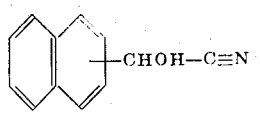

and reacting the imino-ester obtained with an amine of the formula $HNR_1R_2$, in which $R_1$ and $R_2$ each represent a hydrogen atom or a lower alkyl or phenyl radical, and, when the compound of formula I desired is one in which $R_1$ and $R_2$ is hydroxyl, reacting a product so obtained with hydroxylamine, and optionally converting a base so obtained into a non-toxic acid addition salt thereof.

The invention is illustrated by the following examples.

EXAMPLE 1

25 ml. of 40 percent aqueous sodium bisulphite solution are added to a suspension of 15.6 g. (0.1 mol) of β-naphthaldehyde in 70 ml. of water and the mixture is stirred for several hours. After standing overnight, a solution of 7 g. (0.1 mol) of potassium cyanide in 30 ml. of water is added dropwise while stirring, followed by 100 ml. of diethyl ether. The ethereal solution is decanted, washed with water, dried over anhydrous sodium sulphate, filtered and, after adding 6 ml. of ethanol, saturated with dry hydrogen chloride. After standing overnight, the precipitate of 1-(β-naphthyl)-1-hydroxyacetiminoethyl-ester hydrochloride (19.7 g.) is filtered off.

This precipitate is dissolved in 150 ml. of ethanol, the solution is saturated with ammonia gas, the materials are left in contact for 2 hours, and the product is filtered off. It is recrystallized from water or from ethanol. 1-(β-Naphthyl)-1-hydroxyacetamidine hydrochloride is obtained in a yield of 51 percent (1 g.) as while spangles melting at 218°C. with decomposition. It is soluble in water (5 percent), ethanol, and methanol and insoluble in diethyl ether, ethyl acetate, and acetone.

EXAMPLE 2

50 ml. of a 40 percent aqueous solution of sodium bisulphite (0.2 mol) are added to a suspension of 28 g. (0.18 mol) of α-naphthaldehyde in 60 ml. of water. The mixture is left overnight. A solution of 13.8 g. (0.2 mol) of potassium cyanide in 50 ml. of water is then added while stirring. 200 ml. of diethyl ether are added and the mixture is stirred for a further 4 hours. The ethereal solution is washed with water, dried over anhydrous sodium sulphate and filtered. 12 ml. of ethanol are added to the dry ethereal solution and the mixture is saturated with dry hydrogen chloride in the cold. The mixture is left overnight and the oil which has separated out is repeatedly washed with diethyl ether until it has crystallized. 1-(α-Naphthyl)-1-hydroxyacetiminoethyl-ester hydrochloride (30 g.), m.p. 122°-123°C., is filtered off and washed with diethyl ether.

A solution of 20 g. (0.075 mol) of 1-(α-naphthyl)-1-hydroxyacetiminoethyl-ester hydrochloride in 100 ml. of ethanol and 15 g. (0.25 mol) of isopropylamine is heated for 3 hours at the boil on a waterbath. The mixture is evaporated to dryness in vacuo and the residue is taken up in 100 ml. of water. The aqueous solution is extracted with diethyl ether and then rendered alkaline with concentrated sodium hydroxide solution and extracted with diethyl ether. This ethereal solution is washed with water, dried over anhydrous sodium sulphate, filtered and acidified by adding hydrochloric acid in ethanol solution. The product is filtered off and recrystallized from ethanol. 1-(α-Naphthyl)-1-hydroxy-y-N-isopropylacetamidine hydrochloride is obtained in a yield of 27 percent (9 g.) as white crystals which melt with decomposition at 198°-200°C. It is soluble in water (5 percent) and ethanol, and insoluble in diethyl ether, benzene, ethyl acetate, and acetone.

The pharmacological activities of the compounds according to the invention have been demonstrated as follows.

Activities of 1-(β-naphthyl)-1-hydroxyacetamidine hydrochloride

I. Acute toxicity in mice

Administered intravenously, the $LD_{50}$ is $34 \pm 5$ mg./kg. The symptoms are considerable sedation, dyspnoea and haematuria. Animals which have received 20 mg./kg. of the product administered intramuscularly show a sedation of very short duration.

II. Cardiovascular properties

1. Isolated rabbit heart

The possible β-blocking action was studied on four rabbit hearts perfused by Van Dyke Hastings liquid without barium chloride. The product, injected at a dose of 1 mg. does not exert any inotropic or chronotropic effect and does not modify the action of isoprenaline. At a dose of 2 mg., it does not exert any inotropic or chronotropic effect and reduces the positive inotropic action of isoprenaline by 75 percent. At a dose of 5 mg., it produces a negative inotropic effect of 22 percent, does not modify the rhythm, and blocks the inotropic action of isoprenaline.

2. Arterial pressure of awake rats

Administered intramuscularly at a dose of 15 mg./kg. (one-half of the $LD_{50}$ in mice), the product causes a maximum hypotension of 17 percent in three animals and no action in three other animals. The maximum effect occurs between the 3rd and 4th hours.

Activities of 1-(α-naphthyl)-1-hydroxy-N-isopropylacetamidine hydrochloride

I. Acute toxicity in mice

Administered intravenously, the $LD_{50}$ is $35 \pm 1.2$ mg./kg. The symptoms are exophtalmia, dyspnoea and convulsions. Administered intramuscularly, the $LD_{50}$ is $125 \pm 10$ mg./kg. Death is accompanied by convulsions. Animals which have received 65 mg./kg. of product administered intramuscularly showed no symptoms at all.

II Cardiovascular properties

1. Action on the β-receptors of the isolated rabbit heart

On rabbit hearts perfused with Van Dyke Hastings solution not containing barium chloride, the product, at doses of 0.01 mcg to 1 mcg/ml., causes a positive inotropic action of 10 to 25 percent for about 2 minutes, followed, in 3 experiments out of 4, by a negative inotropic action, and does not change the rhythm. At 10 mcg, the product counteracts the positive inotropic action of noradrenaline (injected at a dose of 0.5 mcg) and of isoprenaline (injected at a dose of 1 mcg) in four hearts.

2. Coronary-dilatant action on the isolated rabbit heart

On a heart perfused with a solution containing barium chloride, the product at a dose of 10 mcg/ml. increases the coronary flow rate by 36 percent, exerts a biphase action on the amplitude (+ 12 percent followed by −60 percent), and does not modify the rhythm. At a dose of 100 mcg/ml., it increases the coronary flow rate by 135 percent.

The invention accordingly includes within its scope pharmaceutical compositions comprising an effective amount of at least one compound of the invention in association with a non-toxic pharmaceutical carrier.

I claim

1. 1-naphthyl-1-hydroxy-acetamidine derivatives of the formula:

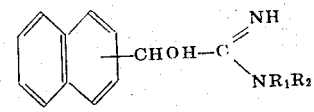

or their hydrochloric salts in which $R_1$ and $R_2$ are selected from the group consisting of hydrogen, lower alkyl and phenyl, and may be the same or dissimilar.

2. 1-(β-Naphthyl)-1-hydroxy-acetamidine or its hydrochloride.

3. 1-(α-Naphthyl)-1-hydroxy-N-isopropylacetamidine or its hydrochloride.

* * * * *